United States Patent

Tufts et al.

[15] 3,696,235

[45] Oct. 3, 1972

[54] DIGITAL FILTER USING WEIGHTING

[72] Inventors: Donald W. Tufts, East Greenwich, R.I.; Ralph E. Burt, Reeds Ferry; Victor I. Davis, Jr., Milford, both of N.H.; James F. Queenan, Lowell; Richard A. Maloon, Chelmsford, both of Mass.; David W. Waterman, Amherst, N.H.

[73] Assignee: Sanders Associates, Inc., South Nashua, N.H.

[22] Filed: June 22, 1970

[21] Appl. No.: 48,398

[52] U.S. Cl. .................................. 235/156, 235/164

[51] Int. Cl. ............................................. G06f 7/38

[58] Field of Search ...............235/156, 164; 328/167

[56] References Cited

UNITED STATES PATENTS

| | | | |
|---|---|---|---|
| 3,283,131 | 11/1966 | Carbrey | 235/164 |
| 3,462,590 | 8/1969 | Jenkins | 235/164 X |
| 3,517,879 | 6/1970 | Conway | 235/156 X |
| 3,521,041 | 7/1970 | Van Blerkom et al. | 235/156 |
| 3,521,042 | 7/1970 | Van Blerkom et al. | 235/156 |
| 3,610,901 | 1/1971 | Lynch | 235/156 X |

OTHER PUBLICATIONS

R. K. Richards, " Arithmetic Operations in Digital Computers," 1955, pp. 141- 144.

*Primary Examiner*—Malcolm A. Morrison
*Assistant Examiner*—David H. Malzahn
*Attorney*—Louis Etlinger

[57] ABSTRACT

Digital filter apparatus in which a set of weighting signal samples to be multiplied in the filter has values which are exactly powers of two such that the filter multiplier network may be comprised of simple signal routing circuits.

3 Claims, 5 Drawing Figures

*INVENTORS*
DONALD W. TUFTS
RALPH E. BURT
VICTOR I. DAVIS, JR
JAMES F. QUEENAN
RICHARD A. MALOON
DAVID W. WATERMAN

BY Robert R. Hubbard
*ATTORNEY*

INVENTORS
DONALD W. TUFTS
RALPH E. BURT
VICTOR I. DAVIS, JR
JAMES F. QUEENAN
RICHARD A. MALOON
DAVID W. WATERMAN

BY Robert R. Hubbard

ATTORNEY

INVENTORS
DONALD W. TUFTS
RALPH E. BURT
VICTOR I. DAVIS, JR.
JAMES F. QUEENAN
RICHARD A. MALOON
DAVID W. WATERMAN

BY Robert R. Hubbard
ATTORNEY

DIGITAL FILTER USING WEIGHTING

BACKGROUND OF THE INVENTION a. Field of Invention

This invention relates to new and improved signal processing apparatus and in particular to digital filter apparatus which is relatively inexpensive and which is useful to detect signals in additive noise.

Digital filter apparatus of this type is useful in any application in which analog filters are employed. By way of example, digital filter apparatus can be employed for spectral analysis of a signal. In one type of spectral analyzer, it is desired to obtain the RMS value of energy in each of several frequency samples or bins within the frequency range of interest. For each frequency bin, N samples of the input signal (as a function of time) are sequentially processed as follows. A current signal sample is cross-correlated in both an inphase channel and a quadraturephase channel with an inphase and a quadraturephase reference signal, respectively, the frequency of the reference signal being the center frequency of the current frequency bin. The inphase and quadraturephase cross-correlation samples are then accumulated over the N samples to produce a pair of digital signals A cos $\theta$ and B sin $\theta$ which are then operated upon to produce another digital number C which is the square root of the sum of the squares of A1 and A2. The successive digital numbers C are further accumulated for each frequency bin to produce a more stable value indicative of the power in that bin. The power values for all the frequency bins, then, are indicative of the spectral response of the signal.

b. Description of the Prior Art

The prior art has utilized both analog and digital filters to detect signals which are in an additive noise. Analog filters have been generally complex, expensive and subject to drift. One type of known digital filter has utilized Fourier transform techniques either in hard-wired algorithm form or in software algorithm form in a general purpose computer.

One of the problems encountered in spectral analysis applications is that sidelobe energy (signal components having frequencies outside but adjacent to the frequency bin of interest) affects the calculation of the energy in a particular frequency bin. In order to reduce this effect, it has been known to employ a suitable weighting function as a multiplier of the signal samples. Weighting functions which substantially suppress the sidelobe energy have required complex multiplying and storage networks.

BRIEF SUMMARY OF INVENTION

An object of the present invention is to provide novel and improved digital filter apparatus.

Another object is to provide digital filter apparatus which employs relatively simple and inexpensive networks.

Still another object is to provide digital filter apparatus in which one of two sets of signal samples to be multiplied in the filter has values which are exactly powers of the radix of the filter.

Yet another object is to provide digital filter apparatus in which one of the two sets of signal samples represents a weighting function and has values which are exactly equal to powers of the radix of the filter.

Still a further objective is to provide a desired, attainable degree of performance in terms of sidelobe reduction and signal detectability.

In brief, digital filter apparatus embodying the invention includes signal generating means for providing first and second sets of signal samples where the samples in one of the sets have values which are exactly equal to powers of the radix. The two sets of signal samples are then multiplied in a radix point translating means which provides radix point translation a number of orders equal to a current radix power value to thereby form products of the signal samples. Consecutive products of the signal samples are then summed in a summation network.

DESCRIPTION OF THE DRAWINGS

In the accompanying drawings like reference characters denote like elements of structure.

DESCRIPTION OF PREFERRED EMBODIMENT

Digital filter apparatus embodying the present invention is contemplated for use in any filter application where weighting is required. However, by way of example and completeness of description, the invention is described herein for a spectral analysis application. In addition, though the invention can be generally practiced with any system radix, the illustrated embodiment employs a radix of two or a binary system.

Figure 1:
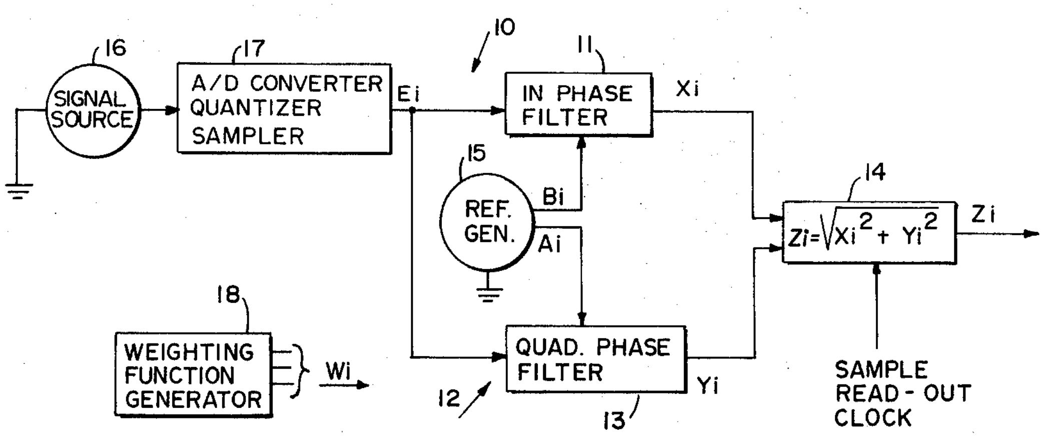
FIG. 1 is a block diagram illustrating a spectral analysis application in which the digital filter of the present invention may be employed.

The spectral analysis application is generally illustrated in FIG. 1 where an information signal sequence E*i* is correlated in an inphase channel 10 and in a quadraturephase channel 12 by inphase and quadraturephase correlation signal sequences, to provide correlated signal sequences X*i* and Y*i*, respectively. The correlated signal sequences X*i* and Y*i* are then operated upon to produce the square root Z*i* of the sum of their squares by means of a root mean square generator 14.

The inphase and quadraturephase channels include inphase and quadraturephase filters 11 and 13, respectively. A reference generator 15 provides an inphase correlation (or reference) signal sequence B*i* and a quadraturephase correlation signal sequence A*i* to the inphase and quadraturephase filters, respectively. That is, the signal samples E*i* are cross-correlated in each channel with a signal levels (i.e., of the correlation (i.e., As a For signals. The frequencies of the correlation signals B*i* are stepped sequentially from one frequency bin to the next across the frequency range of interest as each set of N signal samples E*i* are processed.

The information signal is provided by a signal source 16 which provides a signal in additive noise. The information signal is converted from an analog form to a digital form by a converter device 17. Device 17 in one simple form may be embodied as a hard limiter such that the signal sequence E*i* is quantized to two signal levels (i.e.) a single bit number capable of having one or the other of two values). In other forms, the converter device 17 may provide a sequence of samples E*i* which are quantized to more than two values (i.e., a multibit number capable of having more than two values). As a further example, converter device 17 may include a sampler and quantizer for providing quantized samples and a storage device for storing such samples and presenting the samples sequentially to the inphase and quadraturephase channels for each frequency value of the reference generator. For the purpose of the present description, the signal samples E*i* are considered to be present during a time period T which is the reciprocal of the system bandwidth. The number of samples occurring during T is N such that $0<i \leq N$.

In addition to forming the cross-correlation products in each channel, sidelobe energy is suppressed by bandwidth weighting. That is, the products in each channel are multiplied by a weighting function sequence W*i* provided by a generator 18. These multiplication functions are illustrated in FIG. 3A which shows a block diagram of one of the digital filters, say the inphase channel filter 11. A first multiplier network 22 responds to a K bit signal sample Ei and an L bit reference signal B*i* to form the product E*i*B*i*. A second multiplier network 28 responds to the product E*i*B*i* and the weighting sequence W*i* of M bits per sequence element to produce a weighted product or E*i*B*i*W*i*. The weighting sequence W*i* is formed by uniform sampling of a desired weighting function as, for example, the one shown in FIG. 2 which is discussed later. A summation device 29 then provides a summation of the bandwidth weighted products $$\sum_{i=0}^{i=N} EiBiWi.$$

In prior art digital filters, complex networks have been required for multipliers 22 and 28 since the binary multiplication of two multibit numbers generally requires means for generating and storing partial sums and for shifting.

It has been found that for many applications, the binary values of the multiplier signals B*i* and W*i* can be quantized or set equal to powers of the radix with a tolerable degree of error in detecting signal energy at a given frequency. Since multiplication of a number Y by another number $R^n$, where *n* is an integer and R is the radix, merely requires a radix point translation, the multiplier networks 22 and 28 can be greatly simplified. For example, consider the binary system where the radix R=2 for values of $n=-1, 0, 1, 2$. TABLE I indicates the resulting products of $2^n$ and a number Y which is equal to 11 in decimal (R=10).

TABLE I

| Binary Orders | Y=11 | ½Y=5.5 | 2Y=22 | 4Y=44 |
|---|---|---|---|---|
| $2^5$ | 0 | 0 | 0 | 1 |
| $2^4$ | 0 | 0 | 1 | 0 |
| $2^3$ | 1 | 0 | 0 | 1 |
| $2^2$ | 0 | 1 | 1 | 1 |
| $2^1$ | 1 | 0 | 1 | |
| $2^0$ | 1 | 1 | 0 | 0 |
| Binary Point | | | | |
| $2^{+1}$ | 0 | 1 | 0 | 0 |
| $2^{+2}$ | 0 | 0 | 0 | 0 |

As can be seen from TABLE I, the product is formed by merely translating the binary point of the number Y by *n* orders or places. In TABLE I, the product of Y and $2^0$ is, of course, the number Y itself and is, therefore, not shown separately. For the case where both the multiplier and multiplicand are multibit numbers, the binary point translation can be readily performed by a gating network which responds to the B*i* (reference) and W*i* signals to translate the binary point of the information signal E*i*.

For the simple case where the number of bits in both the multiplier and the multiplicand is equal to 1 (single bit numbers), the multiplier may take the form of any suitable single bit multiplying network, as, for example, an EXCLUSIVE OR network (or an $\overline{\text{EXCLUSIVE}}$ OR network). As used herein, the term single bit number refers to a number having a magnitude of unity and either a positive or negative sign. Accordingly, the magnitude of unity is assumed such that only the sign bit need be operated upon. By way of example, the signals E*i* and B*i* have been chosen as single bit numbers for the illustrated embodiment as discussed more fully in connection with FIG. 3B. Suffice it to say here that the product E*i*B*i* will also be a single bit quantity.

Finally, for the case where the multiplicand is single bit and the multiplier is multibit it can be shown that the radix point translation results in a product which is always the positive or the negative of the multibit number. That is, the multiplier or radix point network merely routes the multibit number to one set of leads if the single bit number is a "1" and to another set of leads if the single bit number is a "0". Multiplier or radix point translator 28 is of this type as we have chosen to illustrate the case where the W*i* elements are multibit numbers. For such case, the summation network 29 may take the form of a counter which is incremented and decremented when E*i*B*i*W*i* is positive, and negative, respectively, the product E*i*B*i*W*i* being applied to the appropriate orders of the counter (the least significant ones). Alternatively, the counter could be unidirectional with a counting range which is adequate to handle the number of samples in any particular frequency bin. For such case, the counter can be set initially to a negative number with the positive and negative values of E*i*B*i*W*i* being interpreted as count and no count, respectively.

Figure 2:
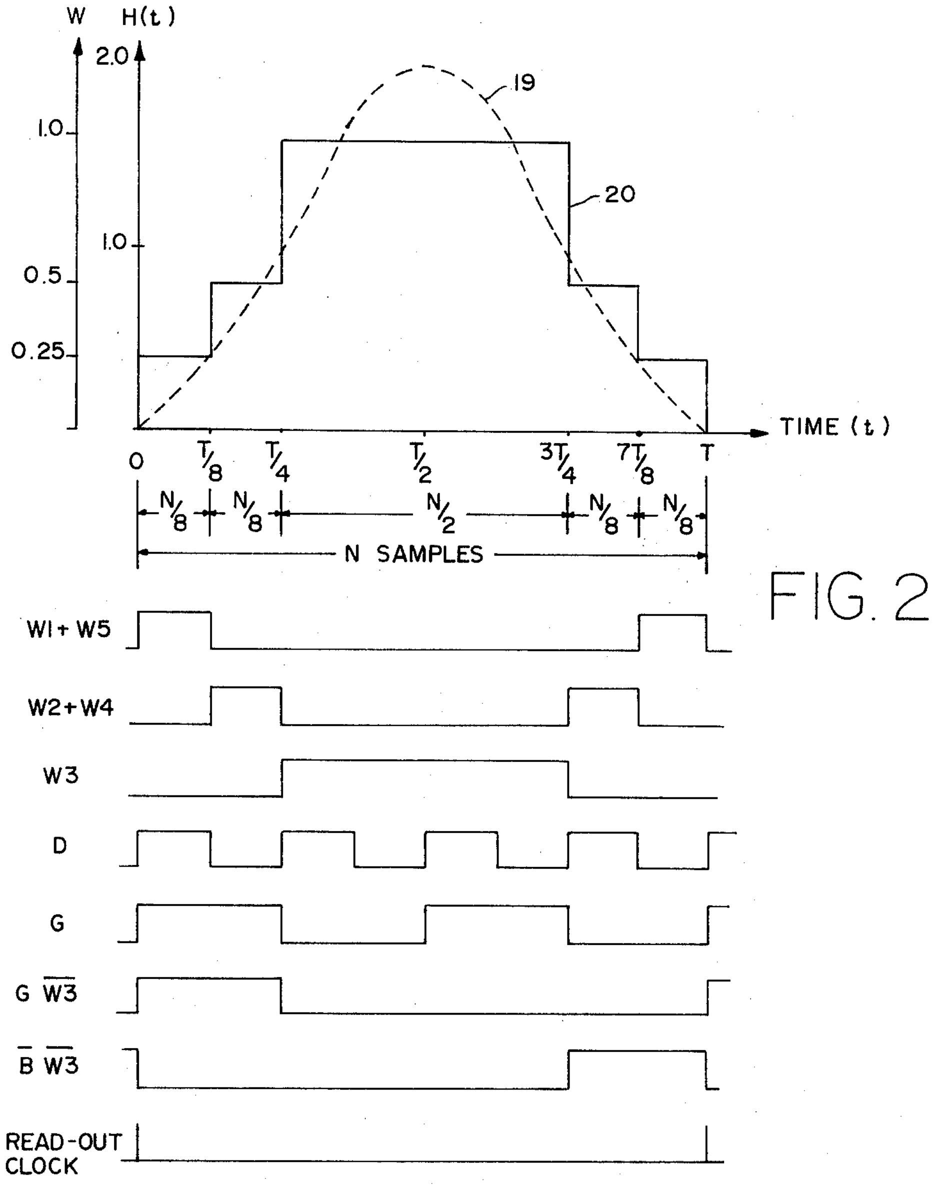
FIG. 2 is a graph, in part, and signal waveforms, in part, representing a weighting function which is employed in the illustrated embodiment of the invention.
Figure 3A:
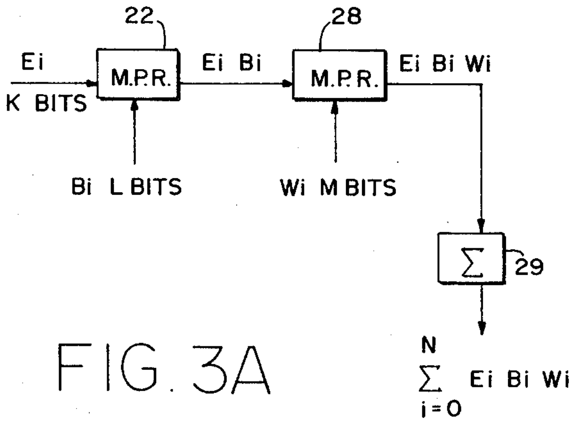
FIG. 3A is a block diagram illustrating digital filtering apparatus in accordance with the present invention.

The particular weighting function embodied in the illustrated example can be considered as an approximation of the function $H(t)=1-\cos\theta$ as shown by the dashed curve 19 in FIG. 2. As can be seen in FIG. 2 H(t) is zero at times 0 and T and maximum (2 units) at T/2. For the illustrated example, W*i* is given the values $2^{-2}$, $2^{-1}$ and $2^0$ as shown by the solid curve 20. Preferably, each power of 2 value is uniform for a fixed interval which is a power of 2 submultiple of the period T. This enables the W*i* sequence to be conveniently derived from the system clock. Thus, W*i* is $2^{-2}$ during the periods 0 to (T/8) (TP1) and 7T/8 to T(TP5); $2^{-1}$ during the periods T/8 to (T/4) (TP2) and 3T/4 to (7T/8) (TP4), and $2^0$ from T/4 to (3T/4) (TP3). Thus, the time period T is divided into 5 portions TP1 through TP5.

The weighting function W*i* is additionally represented in FIG. 2 by the weighting signals W1 + W5, W2 + W4 and W3 shown below the H(*t*) graph and on the same time scale. As there shown, the weighting signals are bivalued with each being high (the high value is assumed to be the binary value "1") during correspondingly numbered time periods TP. The binary values of Wi are shown in TABLE II below for each of the time periods TP1 through TP5.

TABLE II

| TP1 | TP2 | TP3 | TP4 | TP5 |
|---|---|---|---|---|
| 1 | 0 | 0 | 0 | |
| 0 | 1 | 0 | 1 | 0 |
| 0 | 0 | 1 | 0 | 0 |

Figure 4:
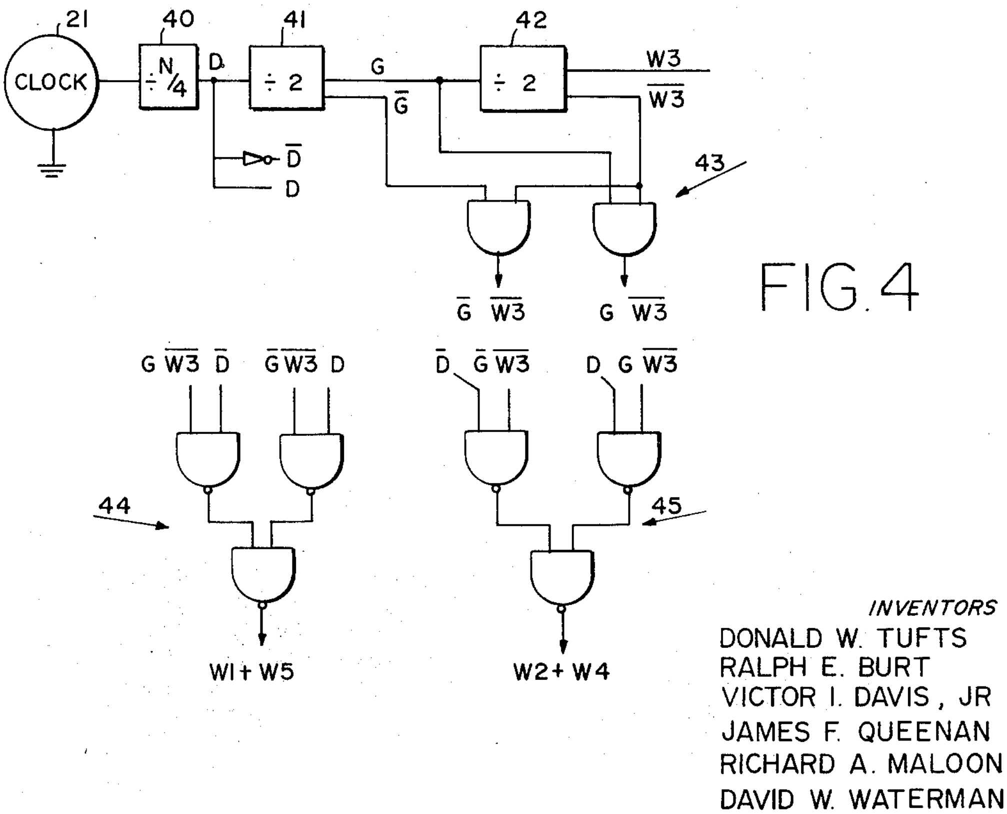
FIG. 4 is a block diagram illustrating a technique of obtaining the weighting signal samples from the clock source of the digital filter.

One exemplary technique of obtaining the W*i* weighting signals will now be described with reference to both FIGS. 2 and 4. In this technique, there is derived from the system clock 21 a signal D having a cycle time of T/4 as shown in FIG. 2. As shown in FIG. 4 the weighting function generator 18 includes a divider 40 which divides the clock frequency by N/4. For example, where N=1, 024, the divisor is 256. A pair of divide by 2 networks 41 and 42 are employed to obtain D/2 and D/4, designated as G and W3, respectively, in FIGS. 2 and 4.

The G and W3 signals are combined in an AND gating net 43 to produce the signals $\overline{G}W3$ and $G\overline{W3}$. These signals $\overline{G}W3$ and $G\overline{W3}$ are further combined with the $\overline{D}$ and $\overline{D}$ signals in NAND gating nets 44 and 45 to produce the W1 = W5 and W2 = W4 signals, respectively. Since the detailed operation of the gating nets in combining the foregoing signals is rather straight forward and apparent to those skilled in the art, especially when viewed with respect to the FIG. 2 waveforms, further discussion thereof is unnecessary. However, it is well to point out here that the read-out clock waveform illustrated in FIG. 2 to occur at the end of each period T is produced by means (not shown) which responds to the system clock on the trailing edge of the $\overline{GW3}$ signal. This read-out clock signal is employed in FIG. 1 to sample the output of root mean square generator 14 at the end of each period T.

Figure 3B:
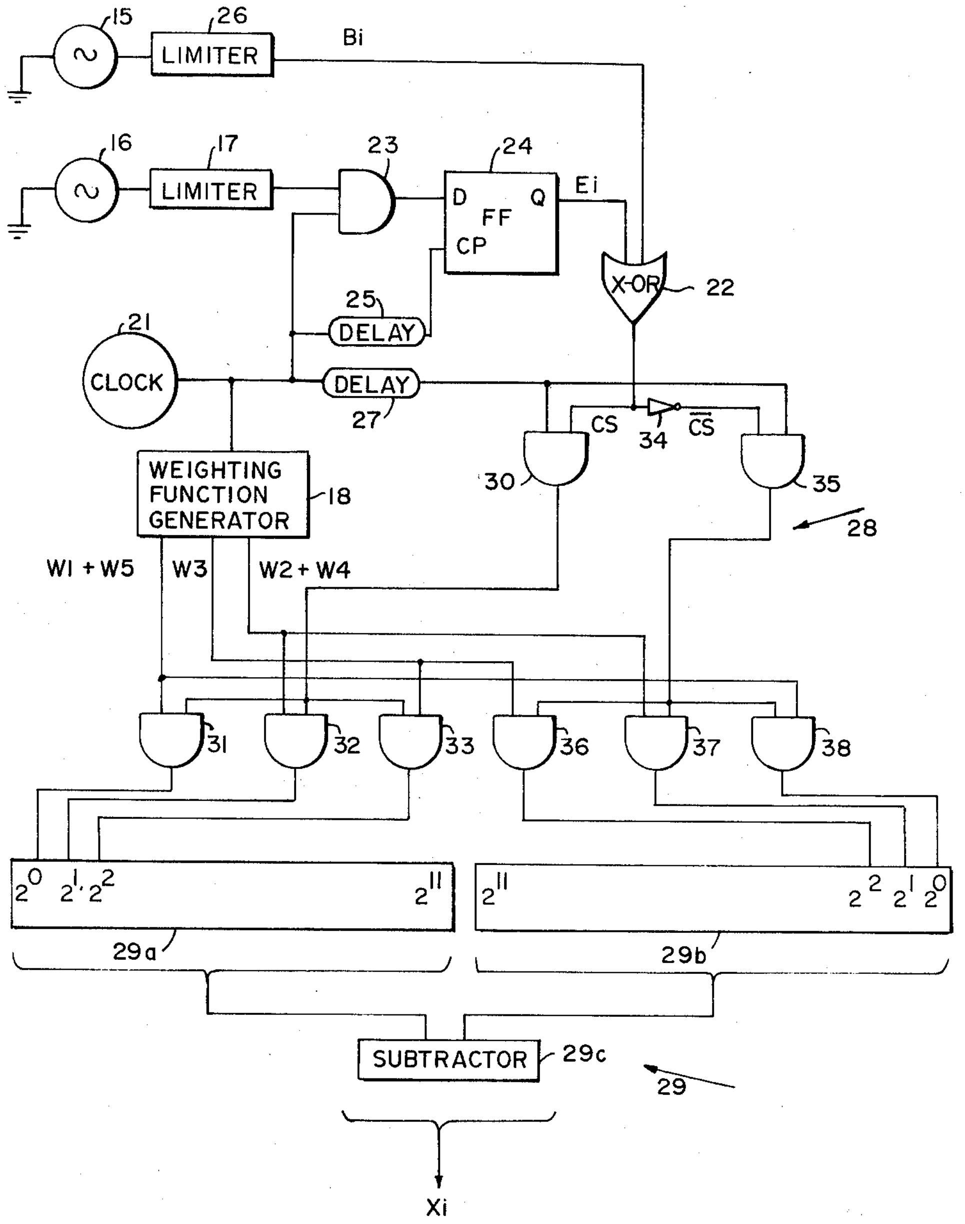
FIG. 3B is a block diagram which illustrates the FIG. 3A block diagram in much more detail.

Referring next to FIG. 3B, there is shown digital filter apparatus embodying the invention. For the sake of convenience only the inphase filter 11 is shown, the quadrature phase filter 13 being of similar design. The weighting function generator 18 responds to a system clock 21 to produce the W*i* signals W1 = W5, W3 and W2 = W4. The single bit signal samples E*i* and the single bit reference signal B*i* are correlated by means of multiplier network 22 to produce a correlated signal. The correlated signal sequence (E*i*B*i*) and the W*i* weighting sequence are multiplied in another multiplier network 28 to produce the bandwidth weighted product EiBiWi.

The single bit signal sample E*i* is derived in the following manner. The output of the information signal source 16 is hard limited by limiter 17 and clocked via an AND gate 23 to the D input of a D-type flip-flop 24. The flip-flop 24 is also clocked at the rate of the system clock, but delayed by delay device 25 a suitable amount to compensate for signal propagation delays through AND gate 23. The Q output of flip-flop 24 then is a non-return to zero (NRZ) signal which is applied as one input to the multiplier 22. This signal corresponds to the E*i* signal samples of FIG. 1.

The reference signal sequence B*i* is derived from reference signal source 15 (which for the present example is a sine wave source) and hard limited by limiter 26 to produce a bivalued quantization of the reference, which turns out to be a square wave for the illustrated example. As previously pointed out, either or both the information signal sequence E*i* and the reference signal sequence B*i* can be quantized to more than two values as desired for a particular application. Though not specifically shown, the reference signal sequence B*i* is synchronized with the system clock 21.

For the illustrated example, single bit multiplier 22 may suitably be an EXCLUSIVE OR network which produces either an EXCLUSIVE OR output or the complement thereof. As is known in the art, the output of an EXCLUSIVE OR network is high only when either one or the other, but not both, of its inputs is high (non-identity) and is low for all other input signal conditions (identity). Thus for the illustrated example, the output of EXCLUSIVE OR network 22 is high and low when its input signals E*i* and B*i* are non-identical and identical, respectively. The foregoing identity and non-identity operation is sometimes referred to as modulo two addition. For the illustrated single bit representations of the signals E*i* and B*i*, the multiplier network 22 takes the form of a single EXCLUSIVE OR gate.

The output of EXCLUSIVE OR network 22 is designated as CS (for correlated signal) in FIG. 3B. The CS signal is multiplied by the 3-bit weighting function W*i* in multiplier network 28. The multiplier 28 can suitably be any signal shifting network and for the sake of simplicity is shown herein as a signal routing network which steers the W*i* bits to the outputs of AND gates 31, 32 and 33 if CS is a "1" and to the outputs of AND gates 36, 37 and 38 if CS is a "0". This steering is accomplished in response to the system clock which is applied to AND gates 30 and 35. AND gate 30 receives as a second input the CS signal and AND gate 35 receives as a second input the complement signal $\overline{CS}$ via an inverter 34. The clock signal is delayed by delay 27 a sufficient amount to account for signal propagation delays in the E*i* and B*i* signal paths. Thus during each clock cycle the current bandwidth weighting bits Wi are multiplied by the CS signal to appear as a positive product at the outputs of gates 31, 32 and 33 or as a negative product of the outputs of gates 36, 37 and 38 in accordance with the value of CS.

The summation network 29 may take any suitable form and is shown herein, by way of example, as a bidirectional counting network 29 including an incrementing or UP counter **29*a*, decrementing or DOWN counter 29*b* and a subtracter device 29*c* for taking the difference of the numbers or contents of the UP and DOWN counters. The output of the subtracter 29*c*** corresponds to the filtered signal X*i* of FIG. 1. As pointed out previously, the counters **29*a* and 29*b* and subtracter 29*C*** could be replaced by any other suitable UP/DOWN counter or a unidirectional counter having a counting range which is adequate to handle the number of samples in any particular frequency bin.

In FIG. 3B the counters **29*a* and 29*b*** each are shown as having 12 orders (bit positions) $2^0$, $2^1$, $2^2$...$2^{11}$, with each order including a binary trigger network. Each counter also includes suitable coupling circuitry between counter orders. The $2^0$, $2^1$ or $2^2$ orders of counter 29*a* receive as inputs the outputs of the AND gates 31, 32 and 33, respectively. The orders $2^0$, $2^1$, or $2^2$ of the counter **29*b* receive as inputs the outputs of AND gates 38, 37 and 36, respectively. Thus, the least significant orders of UP counter 29*a*** receive the 3-bit product E*i*B*i*W*i* when CS (E*i*B*i*) is a "1". When E*i*B*i* is a "0", the least significant orders of DOWN counter **29*b*** receive the 3-bit product. As each such product E*i* B*i*W*i* contains only a single binary "1", only one of the three UP or DOWN (as the case may be) counter orders receives a triggering input from the multiplier 28. As each successive product E*i*B*i*W*i* is formed by multipliers 22 and 28, it is summed to the previously accumulated (or summed) products in counter 29.

The difference of the values contained in UP counter **29*a* and DOWN counter 29*b*** represents the filtered signal X*i* of FIG. 1 and is provided by subtracter device **29*c*. Subtracter device 29*c* may be any suitable network which receives as inputs the contents of the counters 29*a* and 29*b* and takes the difference thereof. Not shown in FIG. 3B is an initializing means for setting the accumulator to an initial value at the start of each sampling period T. Initializing networks and their operation are well known and are omitted here for the sake of brevity. Suffice it to say here that in the illustrated embodiment the UP counter 29*a* is initially set to zero and the DOWN counter 29*b*** is initially set to zero at the start of each sampling period T.

There has been described digital filtering apparatus embodying the invention in which one or more of plural sets of signal samples are given values which are exactly powers of the radix, here binary 2, such that the multiplying networks contained in the filter apparatus may assume relatively simple forms such as signal routing networks, shift registers and the like since the digital multiplication mainly requires radix point translation. Using the powers of 2 weighting function with a sampling rate of 2.77 times the highest frequency of the input signal, the loss in signal detectability is on the order of 0.875 dB in input signal to noise ratio as compared with an ideal matched filter. In addition, the maximum sidelobe power level is more than 24 dB down from the power level of the center frequency of any of the frequency bins.

What is claimed is:

1. Digital filter apparatus comprising
signal generating means including
first means for sequentially producing a set of information signal samples during an interval which is equal to the reciprocal T of the filter bandwidth,
a clock source for producing clock signals, and
means for deriving from said clock signals during said interval a set of weighting signal samples with values (1) which are exactly equal to $R^n$, where R is the radix with the values of *n* being selected to suppress the sidelobes of the filter frequency response and (2) which are constant for time durations which are $R^m$ sub-multiples of the reciprocal T, where *n* and *m* are integers;
radix point translating means responsive to the weighting signal samples to translate the radix points of the information signal samples a number of orders equal to the current values of *n* to thereby produce a resulting sequence of products; and
summation means for algebraically summing said products over said interval T.

2. The invention set forth in claim 1
wherein the radix R equals 2; and
wherein *n* has first, second and third values, the first and third of which are maximum and minimum, respectively; the third value occurring during the first and last T/8 portions of said interval, the second value occurring during the second and next to last T/8 portions; and the first value occurring during the remaining portion of said interval.

3. The invention as set forth in claim 2 wherein said deriving means includes frequency divider means to provide first signals at N/4, N/8, and N/16 of the clock signal frequency where N is the number of samples in a set and further includes means for combining said first signals to produce said weighting signal samples.

* * * * *